United States Patent [19]

Kalmanash et al.

[11] Patent Number: 5,615,032
[45] Date of Patent: Mar. 25, 1997

[54] NIGHTVISION COMPATIBLE DISPLAY WITH ELECTRICALLY ACTIVATED INFRARED FILTER

[75] Inventors: Michael H. Kalmanash, Los Altos; Vijay M. Sethna, Fremont, both of Calif.

[73] Assignee: Kaiser Aerospace and Electronics Corporation, Foster City, Calif.

[21] Appl. No.: 289,424

[22] Filed: Aug. 12, 1994

[51] Int. Cl.$^6$ ............ G02F 1/1335; G02F 1/1347
[52] U.S. Cl. ............ 349/165; 349/77; 349/104; 349/175; 349/193; 349/363
[58] Field of Search ............ 359/66, 102, 68, 359/99, 96, 101, 98, 103, 352, 53, 353, 358, 359; 345/32

[56] References Cited

U.S. PATENT DOCUMENTS

| | | | |
|---|---|---|---|
| 4,508,427 | 4/1985 | Ross | 359/53 |
| 4,514,085 | 4/1985 | Kaye | 356/71 |
| 4,606,613 | 8/1986 | Urabe | 359/98 |
| 4,749,261 | 6/1988 | McLaughlin et al. | 359/63 |
| 4,815,828 | 3/1989 | Rushford | 359/96 |
| 5,016,985 | 5/1991 | Kalmanash et al. | 359/36 |
| 5,032,007 | 7/1991 | Silverstein et al. | 359/96 |
| 5,074,647 | 12/1991 | Fergason et al. | 359/98 |
| 5,280,373 | 1/1994 | Ozawa et al. | 359/96 |

FOREIGN PATENT DOCUMENTS

| | | |
|---|---|---|
| 60-139786 | 7/1985 | Japan . |
| 61-57935 | 3/1986 | Japan . |

OTHER PUBLICATIONS

Cole et al "Dependence of absorption and optical contrast of a dichroic dye guest on the pitch of a chiral nematic host" Appl. Phys. Letter, vol. 31, No. 2, Jul. 1977–pp. 58–59.

*Primary Examiner*—William L. Sikes
*Assistant Examiner*—Tai V. Duong
*Attorney, Agent, or Firm*—Marvin H. Kleinberg; Arant, Kleinberg, Lerner & Ram, LLP

[57] ABSTRACT

An electrically activated infrared filter utilizes a mixture of infrared absorbing dyes in liquid crystal which normally presents a substantial cross section of dye to absorb the infrared component of impinging light. Polarizing light to be parallel to the direction of liquid crystal alignment enhances the absorption of infrared components. In an alternative embodiment, a chiral additive to the liquid crystal solution increases the dye cross section density which, by absorption, attenuates a higher proportion of the infrared wavelengths. A predetermined voltage differential across the cell aligns the liquid crystal and dye molecules to the voltage gradient, presenting a substantially non-absorptive path to the infrared components of impinging light.

3 Claims, 3 Drawing Sheets

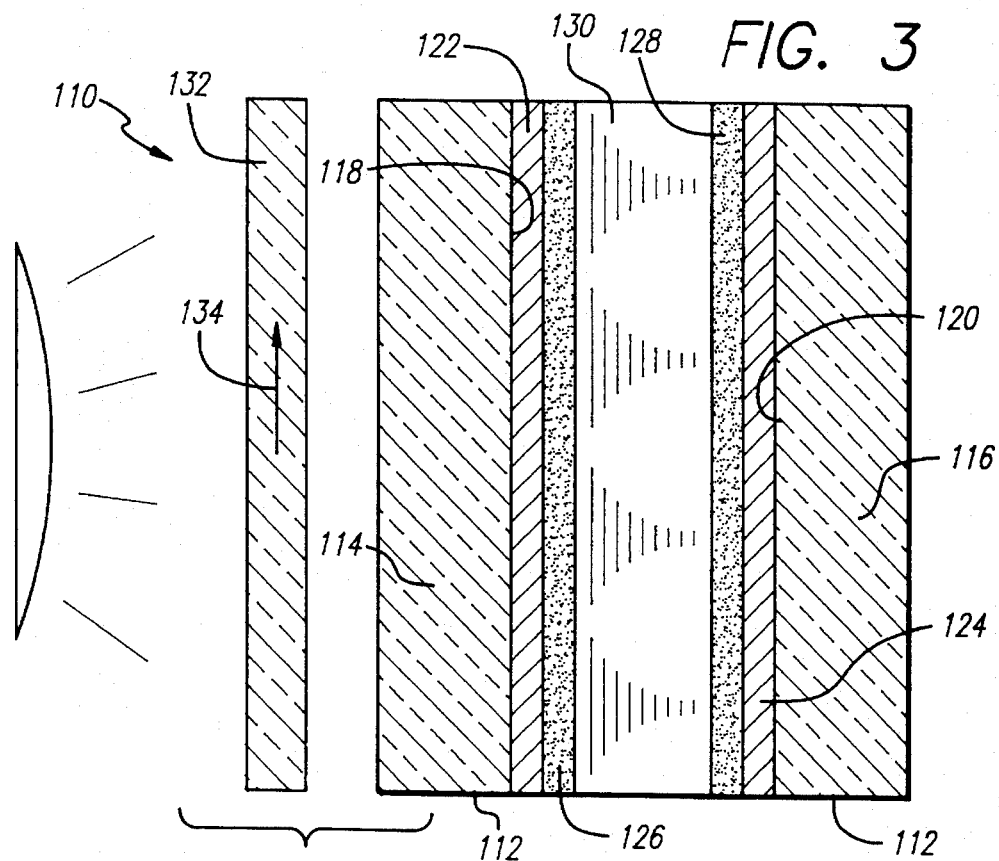
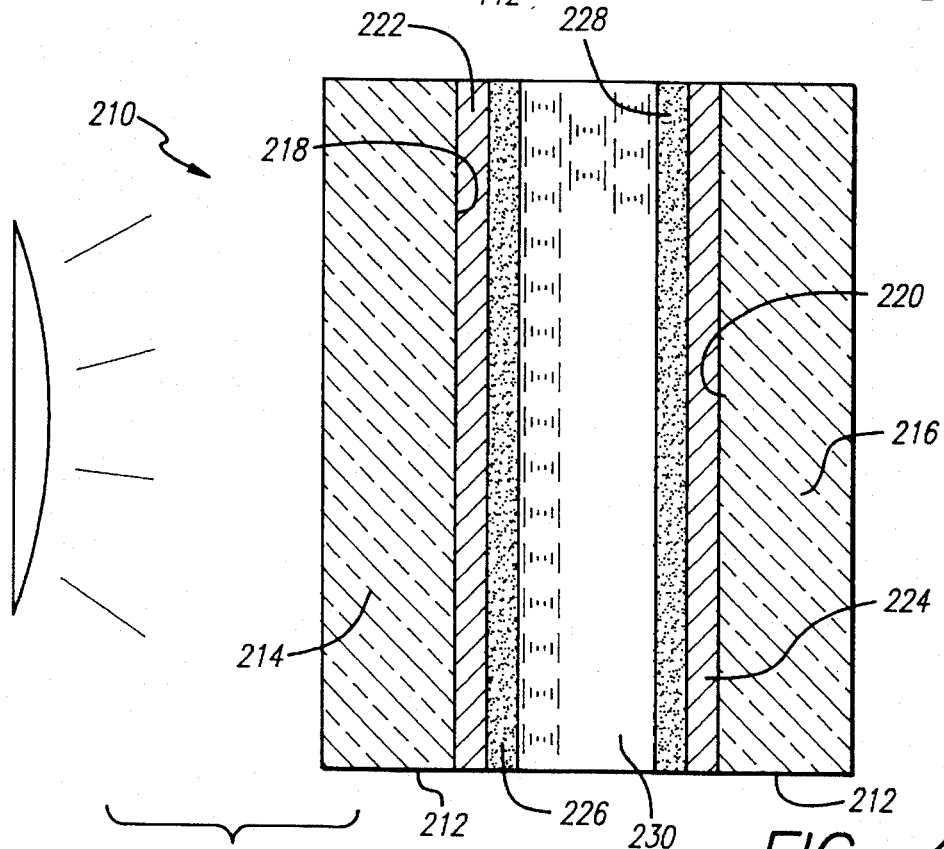

NIGHTVISION COMPATIBLE DISPLAY WITH ELECTRICALLY ACTIVATED INFRARED FILTER

BACKGROUND OF THE INVENTION

1. Field of the Invention

The present invention relates in general to optical filters and, more specifically to an electrically activated and deactivated liquid crystal infrared filter, suitable for use with a night vision imaging system.

2. Description of the Prior Art

The design of display systems to be used in close proximity with night vision imaging systems (NVIS) is complicated by the extreme sensitivity of NVIS to infrared and near infrared radiation. To avoid overwhelming delicate receiving circuitry with a surfeit of long wavelength light, it is generally desirable to filter any nearby light sources (including electronic displays) to prevent the emission of those radiation components to which the NVIS is most sensitive.

Unfortunately, available infrared filters also block some red, orange and yellow light. As a result, present infrared filters distort the color balance of multicolor electronic displays by attenuating the lower frequency, longer wavelength components of visible light. Furthermore, both color and monochrome displays suffer attenuation when filtered to remove infrared. This is especially true for relatively long wavelength (red, orange or yellow) monochrome displays.

Moreover, for some applications, such as avionics display systems, it is difficult to remove the filter during the daytime and, as a result, color degradation and attenuation is sustained even when night vision protection is not needed.

For those systems where concerns of weight, size and convenience weigh against the mechanical placement and removal of an infrared filter in front of a display, an infrared filter which could be turned on and off electronically would aid the viewer by improving the daytime characteristics of the display. Up until now, there has been no simple device specifically addressed to this problem.

3. Prior Art References

The prior art, typified by the patent to Silverstein et al., U.S. Pat. No. 5,032,007 does not specifically address the problem described above. Silverstein et al., discloses a filter with three layers of controllable color absorptive liquid crystal media, each layer being absorptive to a different wavelength of visible light. By controlling the different layers, a multi-colored display may be created. The disclosed device may also be used to add color highlights to a monochromatic display.

U.S. Pat. No. 4,749,261, to McGlaughlin et al., teaches a polymer encapsulated liquid crystal panel for use in automobile sunroofs. Infrared filtering is but an incidental part of this disclosure. As it is not under user control, it does not address the issue of avoiding filtering out the lower wavelengths of visible light when infrared filtering is not necessary. In the patent granted to Fergason et al., U.S. Pat. No. 5,074,647, a high speed liquid crystal shutter is disclosed. This device is intended for use with welder's helmets and similar devices.

U.S. Pat. No. 3,833,287, granted to Taylor et al., describes the construction and use of guest-host liquid crystal devices which normally absorb unpolarized light. Color guest host liquid crystal devices without polarizers are disclosed in U.S. Pat. No. 4,396,251, granted to Mukoh et al. Although these patents do help form the foundation for the general field of guest host liquid crystal devices, they do nothing to address the specific problem outlined above.

The patent to Suzuki et al., U.S. Pat. No. 4,257,682 teaches a color liquid crystal device utilizing a guest host effect as well as an electrically controlled birefringence effect, to get a two color device. U.S. Pat. No. 4,396,250, granted to Wada et al., discloses multi-layer guest host liquid crystal devices without polarizers. Although both of these disclosures relate to further developments utilizing guest host liquid crystal technology, they do nothing to address the problem of the unwanted side effects of infrared filtering confronted here.

It is, therefore, an object of the present invention to provide a simple and novel electrically activated infrared filter.

It is a further object of this invention to provide an infrared filter for shielding a night vision imaging system from the infrared radiation emitted by a light source, where such shielding may be easily and automatically removed during the daytime.

It is yet another object of the invention to provide a full color electronic display with a filter that can be activated at night to block all display emissions that could adversely affect NVIS equipment.

SUMMARY

The present invention comprises an electrically activated infrared filter formed from a cell containing liquid crystal molecules mixed with a carefully chosen dye or mixture of dyes that is particularly absorptive in the infrared region. In this arrangement, the dye molecules, which must be similar in size and shape to the liquid crystal molecules, fit into the crystal structures formed by the surrounding liquid crystal molecules in what is known as a "guest-host" configuration.

Although the patent to Silverstein, U.S. Pat. No. 5,032,007, does suggest the spectral shaping of cockpit displays to render them night vision compatible, it fails to disclose the use of liquid crystals with dyes that are absorptive of components of light outside of the range of visible light. Such dyes are important to the implementation of an electronically controllable infrared filter. In addition, the Silverstein, et al. disclosure involves a substantial level of complexity that would drive up the cost of an application as a day/night NVIS filter.

For the night mode, the liquid crystal molecules form helical structures, which start at one surface of the liquid crystal cell and extend toward the other surface. The helical structure rotates light entering the cell that is polarized parallel to the longitudinal axis of the dye and liquid crystal molecules at the entrance surface of the cell by 90°. As the light is guided by the crystal structure, it encounters many dye molecules which are highly absorbent of light in the infrared frequency range. As a result these light waves are purged of infrared frequency components.

Light that is not polarized parallel to the longitudinal axes of the liquid crystals at the front surface ("director axis"), however, may pass through the cell substantially unaffected. To prevent this eventuality, a polarizer may be placed in front of the liquid crystal cell so that only that infrared light that is polarized to be parallel to the director axis of the liquid crystals reaches the cell. Virtually all of this infrared light can then be absorbed by passage through the dye and liquid crystal cell helical structures.

Although a polarizer theoretically could also be placed after the liquid crystal cell, such an arrangement would limit the viewing angle of the user without a concomitant benefit.

Another approach to prevent the passage of infrared light components that are not polarized along the director axis is to add a chiral additive to the liquid crystal and dye mixture. Such an additive causes the crystals and dye to twist into tighter helical structures thereby presenting a denser pattern of crystal and dye to the incoming light. This absorbs even more of the infrared components of the impinging light.

To temporarily eliminate infrared absorption, as is desirable during the daytime, a voltage is applied across the liquid crystal cell sufficient to straighten the helical structures. Since the liquid crystal and the dye molecules, under these conditions, arrange themselves with their longitudinal axes substantially orthogonal to the cell front transparent wall, very little of the surface of these molecules is presented to the light that is transmitted through the cell. Therefore, light passes through the cell with substantially no attenuation of any of its frequency components.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 3 is a diagrammatic drawing of an alternative embodiment of an electrically activated filter according to the present invention in its "voltage off" or "filter on" state;

FIG. 4 is a diagrammatic drawing of yet another alternative embodiment of an electrically activated filter according to the present invention in its "voltage off" or "filter on" state;

DETAILED DESCRIPTION OF THE PREFERRED EMBODIMENT

Figure 1:
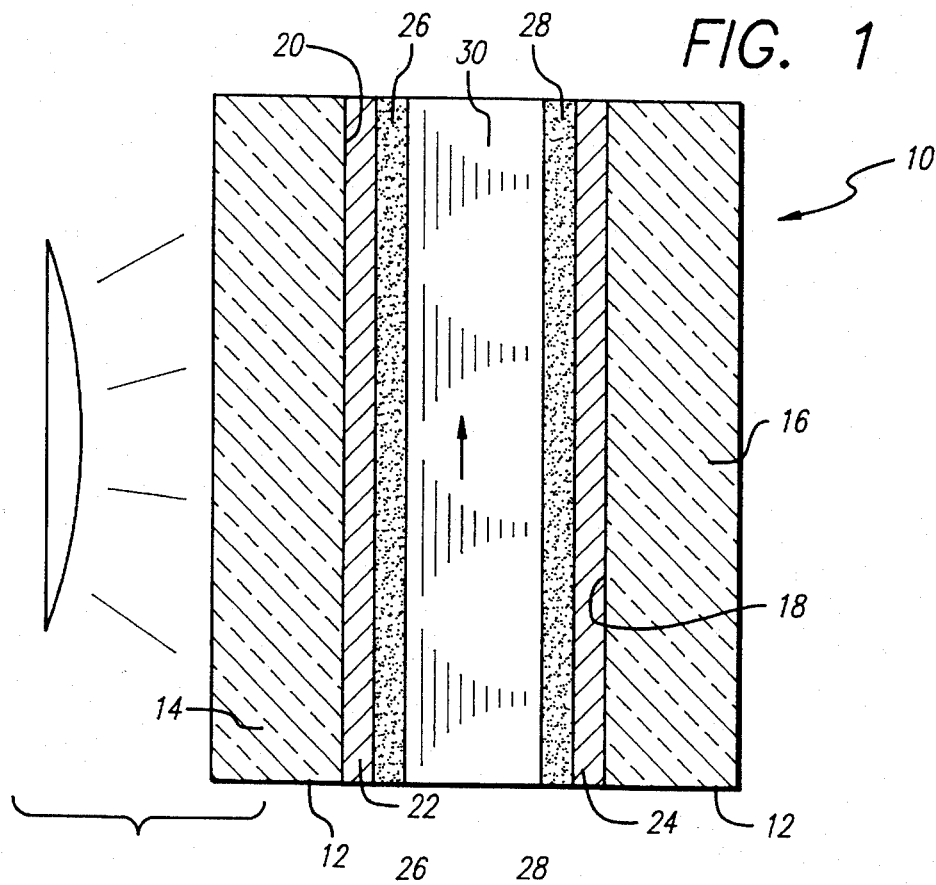
FIG. 1 is a diagrammatic drawing of an electrically activated filter according to the present invention in its "voltage off" or "filter on" state.

FIG. 1 is a diagrammatic side sectional drawing of an electrically controlled infrared filter 10 in the "voltage off" state. A glass cell 12 having a glass front wall 14 and rear wall 16 each with an interior face 18 and 20 respectively each face in turn being coated with an indium tin oxide (ITO) layer 22 and 24 respectively. Indium tin oxide is a substance that is both conductive and transparent. These opposed layers 22 and 24 serve as electrical leads to provide a consistent voltage difference from the front ITO layer 22 to the rear ITO layer 24 without interfering with the passage of light through the cell.

This ITO layers 22 and 24 are, in turn, both coated with a dielectric layer 26 and 28 respectively which aid in the alignment of the liquid crystal and dye molecules. A mixture of cholesteric liquid crystals and one or more dyes 30 is placed in the interior of the cell 12. It should be noted that the structure just described is that of a standard liquid crystal cell with the exception that in this case either one dye or a mixture of dyes is added to the liquid crystals.

A suitable material for the liquid crystal substance which serves as a "host" for the dye is available from Hoffman-LaRoche of Basle, Switzerland, designated as NR3033 or RO-TN-3033. It is generally desirable that the dye material have a high percentage of long chain molecules which are beneficial in causing bonding with the liquid crystal molecules, which are generally quite long. Good choices for the dye are anthraquinone (a yellow crystalline ketone) dyes G109 and G117 made by Nippon Kayaku, of Okoyama, Japan which both have maximum absorption at 760 nm; and the dye LCD105 made by Mitsui Toatsu, of Tokyo, Japan which has maximum absorption at 680 nm. This dye is available in the United States from Marubeni Specialty Chemicals, Inc. at 10 Bank St., Suite 740, White Plains N.Y., 10606.

In general, the selected dye or dyes should have good absorption in the range of 630 nm to 930 nm, the wavelengths of infrared light to which the NVIS is most sensitive. In addition, each dye molecule should be much more absorbent to infrared light that is polarized parallel to its molecular axis than for orthogonally polarized infrared light (i.e. a high dichroic ratio). This enables the dye to filter effectively any light when in the voltage "off" or relaxed state as the dye molecules are held in position by the liquid crystal molecules.

Figure 2:
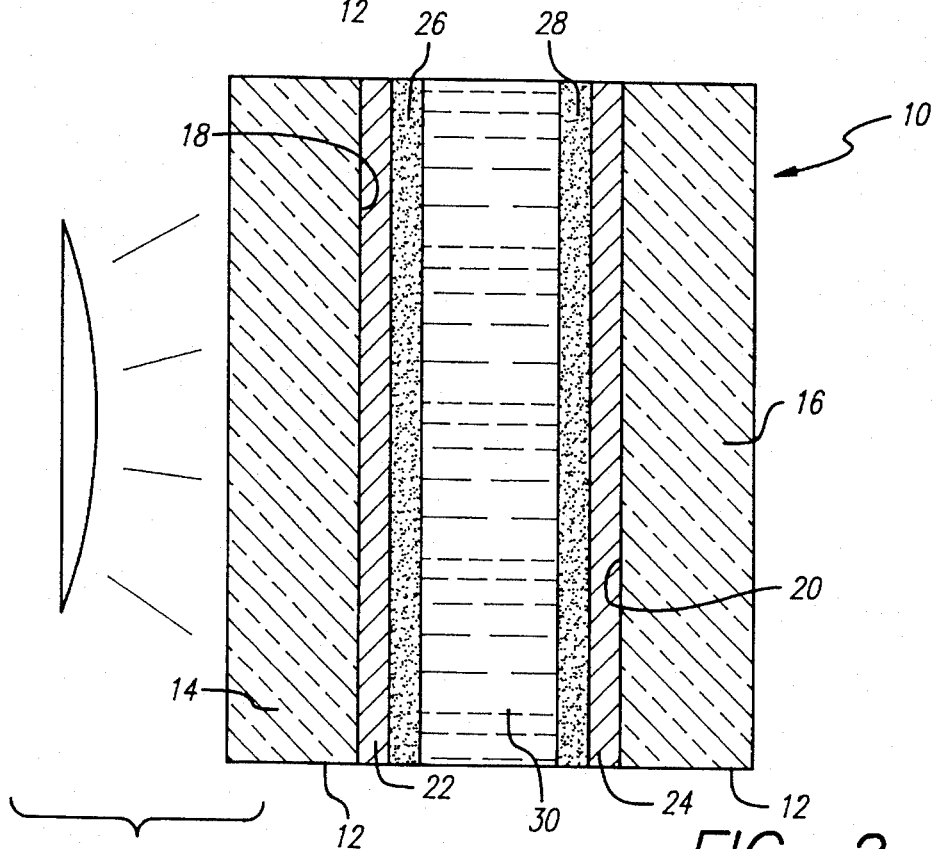
FIG. 2 is a diagrammatic drawing of an electrically controlled filter according to the present invention in its "voltage on" or "filter off" state.

FIG. 2 shows the device of FIG. 1 when a voltage is applied across the cell from one ITO layer 20 to the other ITO layer 22, turning the filter to its "off" state by altering the liquid crystal structure. The helices are untwisted by the voltage gradient so that the liquid crystal molecules and the dye molecules assume an orientation orthogonal to the cell surface. In this configuration, the dye molecules' effect on light will be minimized by the smaller cross-section of dye presented to the passing light and the lessened absorbency for light that is not polarized along the dye molecular axis.

Normally, the molecules form into partial helixes which have a rotation of 90° from the front wall 14 of the device to the back wall 16. The axis of the liquid crystals, which is defined by the orientation of the liquid crystals at the front wall 14 of the cell is called the "director" axis.

Light which enters the device parallel to the director axis is then rotated by 90°. As it is being rotated, the light comes into contact with the dye molecules which are interspersed among the liquid crystal molecules. The infrared light components are absorbed very effectively by the dye molecules. Light that enters the cell with an orientation different than the director axis, however, may encounter many fewer dye molecules and thus pass through the cell unfiltered.

FIG. 3 is a diagrammatic drawing of an alternative embodiment of the present invention 110 in its voltage "off" state. The glass case 112, with glass walls 114, 116 and the ITO layers 122,124, dielectric layers 126, 128 and, liquid crystal and dye solution 130 are all as they were in the first embodiment.

In this embodiment, a polarizer 132 is added with its absorptive axis 134 aligned to be parallel to the long axis of the liquid crystal molecules. This design enhances the absorption of infrared light because light oriented parallel to the long axis of the LC molecules is transmitted through the cells along the path of the helical structures, encountering a greater density of dye molecules in the process and therefore being well filtered. Light polarized orthogonally to the long axis of the molecules, however, is filtered out by the polarizer. Absent such filtering, this light would be able to pass through the cell between helical structures, avoiding contact with the dye molecules and emanating from the other side relatively unfiltered.

FIG. 4 is a diagrammatic drawing of another alternative embodiment of the present invention 210 in the voltage "off" state. The glass case 212, with glass walls 214,216 and the ITO layers 222, 224, and dielectric layers 226, 228 are all as they were in the first embodiment. In this embodiment a chiral additive augments the liquid crystal and dye mixture. One chiral additive suitable for this purpose is offered as CB-15 by E. Merck, of Germany and is available in this country from EM Industries of Hawthorne, N.Y. This additive may be described by the following chemical statement:

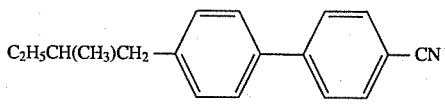

Good results have been achieved with the addition of enough chiral additive to form a 3% mixture with the liquid crystal host.

As a result, the liquid crystal and dye molecules are formed into even tighter helices 230, which presents a much more dense array of dye molecules to impinging light.

Each one of the three embodiments shown forms an infrared filter in the "voltage off" state. The embodiment shown in FIGS. 1 and 2, however, forms a rather poor filter in this state, however, because a high proportion of the light that is not polarized along the director axis of the liquid crystals may pass through unfiltered. To correct this problem, the embodiment shown in FIG. 3 includes an entrance polarizer to prevent such light from reaching the reaching the liquid crystal cell. The remaining light, polarized along the director axis, will be infrared filtered. Another approach to the problem of light not polarized along the director axis is to form tighter helixes through the addition of a chiral additive. In this embodiment, shown in FIG. 4 the filter is far less sensitive to the polarization of the impinging light. That is, it filters all the impinging light without regard to its polarization.

When the voltage is turned on, the liquid crystal helices are straightened, presenting a low cross section of liquid crystal and dye molecules to the impinging light. As a result, there is no significant infrared filtering while the liquid crystals are in this state.

The result of the design is an infrared filter which can be turned "on" and "off" with the flip of a switch. This is useful for the pilot who wants to easily rid himself of the color dulling effects of an infrared filter during daytime when an infrared filter is unnecessary.

Figure 5:
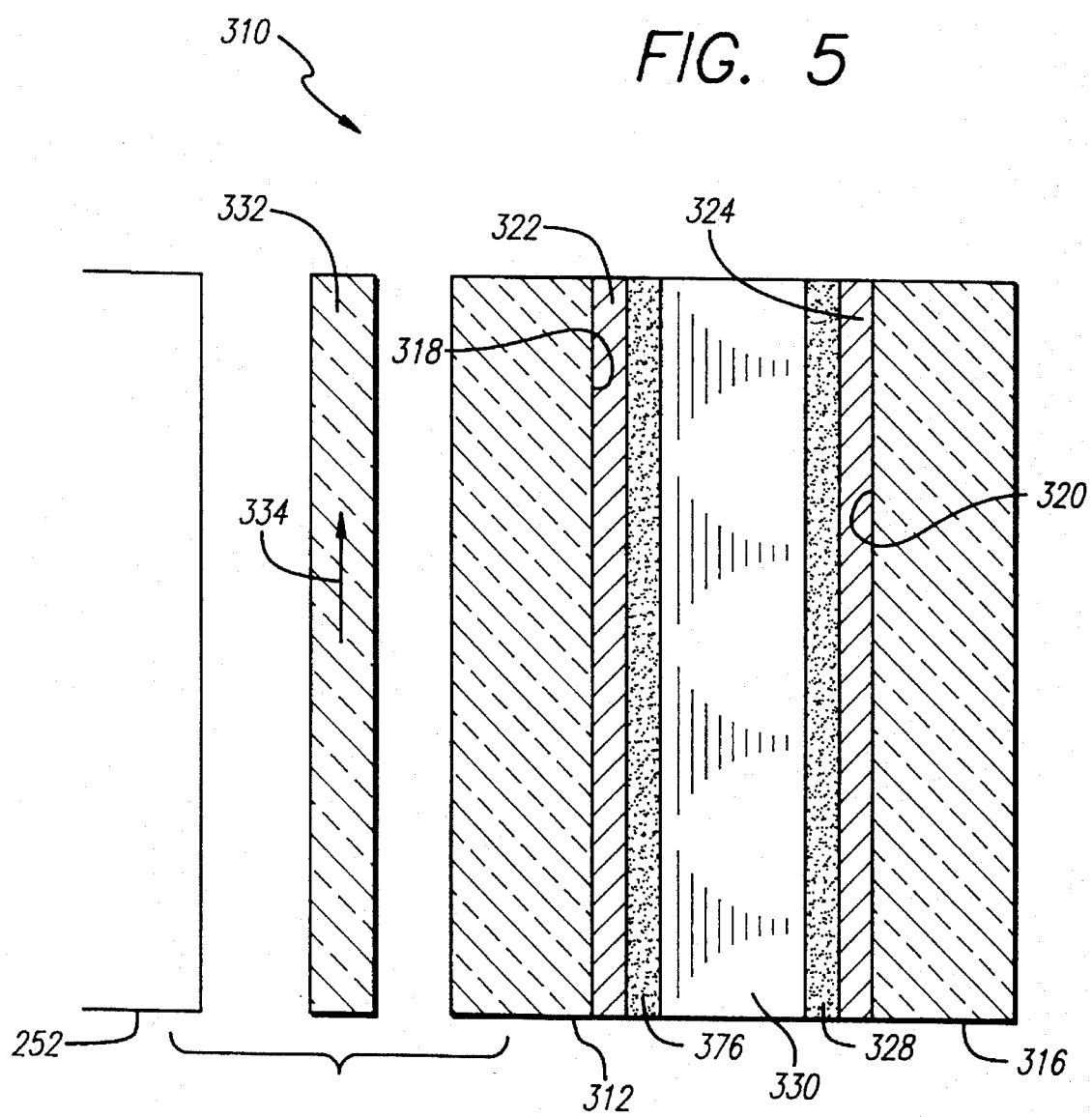
FIG. 5 is a diagrammatic drawing of a color display embodying the present invention by incorporating an electrically activated filter.

FIG. 5 shows a display 310 which embodies the present invention by incorporating an electrically activated infrared filter. Image source 334 may be a CRT, LCD, fiber optic display or an other sort of image source. All the other elements of this figure are the same as FIG. 3 and have been given similar reference numbers. They are all labeled with the same numbers as in FIG. 3 but with 200 added. This particular embodiment includes a polarizer 332 between the image source 334 and the liquid crystals 330, this polarizer 332 is not necessary in all embodiments of the invention. All of the other elements are as described in the previous figure. The liquid crystal material may or may not include a chiral additive, depending on the characteristics desired.

What is claimed is:

1. A night vision imaging system comprising:

an image source;

a liquid crystal cell;

controllable means to create an electrical potential gradient across said cell;

at least one infrared absorptive dye dissolved into the liquid crystal material of said liquid crystal cell for removing the infrared and near infrared components of impinging light from said image source; and a chiral additive mixed with the solution of dye and liquid crystal material;

said cell absorbing virtually all of the infrared and near infrared light components while passing virtually all of the visible components of the impinging light from said image source in the absence of an electrical potential gradient across said cell and, when an electrical potential gradient of a predetermined magnitude exists across said cell, reducing the density of dye in the light path to permit the passage of substantially all of the infrared and near infrared components of the impinging light from said image source through the cell.

2. The night vision imaging system of claim 1 wherein said chiral additive is in an amount approximately equal to 3% of the solution.

3. The night vision system of claim 1 further including a polarizer between said cell and said image source, said polarizer being oriented with its axis of polarity set parallel to the director axis of said liquid crystal cell.

* * * * *